United States Patent Office 3,218,817
Patented Nov. 23, 1965

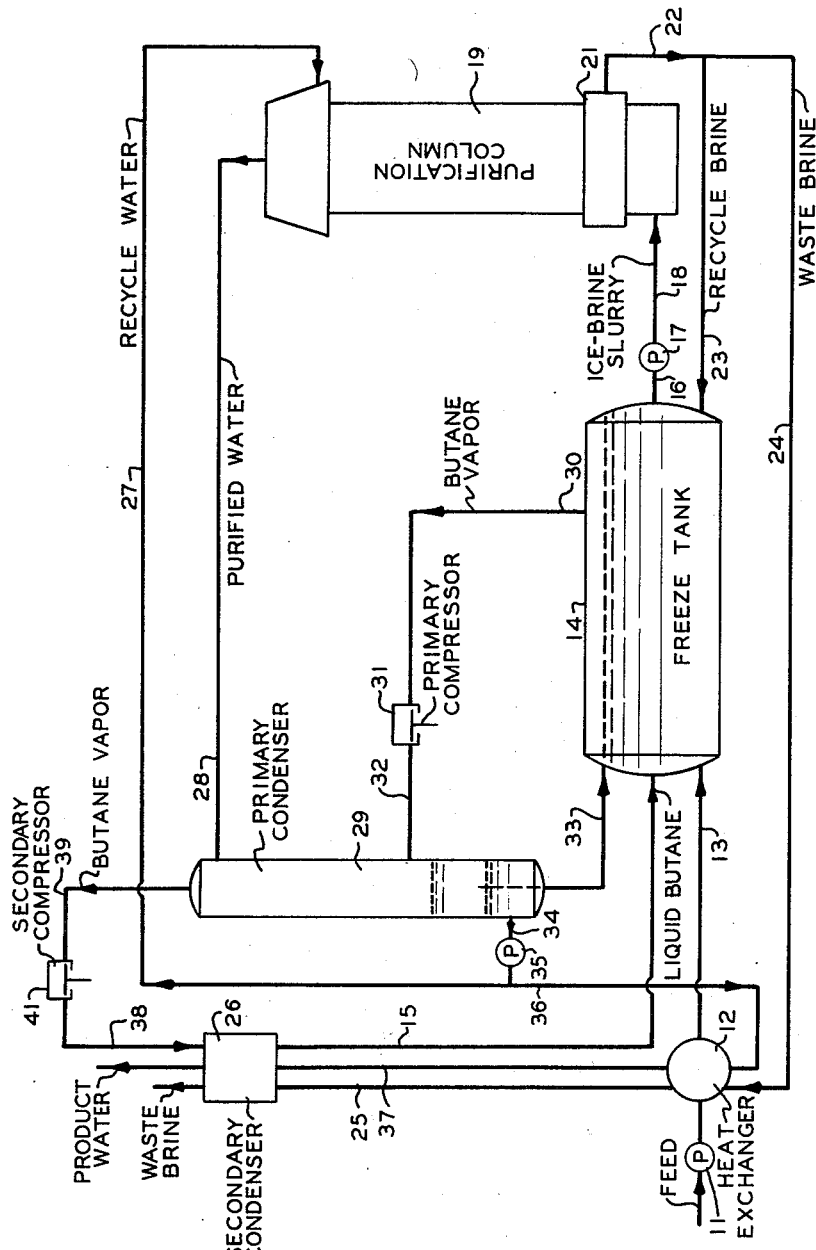

3,218,817
FRACTIONAL CRYSTALLIZATION
James F. Tooke, Bartlesville, Okla., assignor to Phillips Petroleum Company, a corporation of Delaware
Filed Apr. 2, 1962, Ser. No. 184,080
9 Claims. (Cl. 62—58)

This invention relates to method and apparatus for separating the components of a fluid mixture by means of fractional crystallization. In one aspect the invention relates to method and means for concentrating an aqueous solution with concomitant production of water separated from the solution. In another aspect the invention relates to the recovery of fresh water from sea water. In yet another aspect the invention relates to the concentration of aqueous solutions and dispersions such as orange juice, milk, and the like.

Various methods of separating the components of a fluid mixture, such as the production of fresh water from salt water, have been proposed. A few, including fractional crystallization, have proven effective, but many of these are uneconomical due to the high cost of such operations and are carried out only on a limited basis.

In accordance with the invention there is provided an improved method and apparatus for separating the components of a fluid mixture wherein a refrigerant is injected into a body of the fluid mixture, the mixture being chilled by the evaporation of said refrigerant therein, thus forming a slurry of crystals of a first component of said mixture in the remaining fluid, the slurry is passed to a purification operation wherein the remaining fluid is separated out as a concentrate and said crystals are melted by contact with a heated liquid stream of said first component to produce a purified liquid product stream of said first component, the refrigerant vapors from the chilling operation are compressed in a first compression zone and then passed in direct heat exchanging relationship with said liquid product stream, a portion of the thus heated liquid product stream is passed to said purification operation as said heated liquid stream of said first component while the thus cooled refrigerant is compressed in a second compression zone and is then passed in indirect heat exchange relationship with the remainder of said thus heated liquid product stream and said concentrate.

Accordingly it is an object of the invention to provide an improved method and apparatus for separating components of a fluid mixture. Another object of the invention is to provide a method and means for the recovery of water from an aqueous solution, such as sea water, at less cost than has heretofore been possible. A further object of the invention is to provide method and apparatus for the removal of water from an aqueous solution with a minimum of expended energy. A still further object of the invention is the provision of a method and apparatus for concentrating a solution. Yet another object of the invention is to provide method and means for efficiently utilizing the cooling capacity of the concentrate and/or the separated component. A still further object of the invention is to provide more efficient melting of the crystals in the purification operation.

Other aspects, objects and advantages of the invention will be apparent from a study of the disclosure, the drawing, and the appended claims to the invention.

Referring now to the drawing there is shown a schematic representation of a fractional crystallization system in accordance with the invention. For purposes of illustration, the invention will be described in terms of a system for the production of fresh water from sea water. Sea water is passed through pump 11 and into indirect heat exchanging relationship with cold brine and product water, obtained as described hereinafter, in heat exchange zone 12, and passed by way of pipe 13 into freeze tank 14. In freeze tank 14 the sea water is chilled by the evaporation of a liquid refrigerant, such as butane, which is introduced into freeze tank 14 by means of pipes 15 and 33. The resulting slurry of ice crystals in concentrated brine is withdrawn from freeze tank 14 by way of pipe 16 and pump 17 and passed through pipe 18 into purification unit 19. Purification unit can be a piston column or auger fed column such as described in Schmidt Reissue Patent 23,810, a stirrer column such as described in McKay Patent 2,823,242, or a pulse column such as described in Thomas Patent 2,854,494. It is a feature of each type of these columns that a purified stream of the separated component, such as fresh water in the process of producing fresh water from sea water, is caused to flow countercurrently to the flow of crystals, thus purifying the impure crystals by the washing and refreezing of the purified water. Thus by actual material exchange, any impurities in the crystals, such as salt inclusions or pockets of salt within crystal clusters, are eliminated.

The mass of crystals pumped to column 19 substantially fills column 19 and passes upwardly therethrough. Concentrated brine passes through filter 21 and pipe 22, from which a portion of the concentrated brine is passed through pipe 23 and into freeze tank 14 as recycle brine. The remainder of the concentrated brine is passed through pipe 24 and into indirect heat exchanging relationship with the sea water feed stream in heat exchange zone 12 to lower the temperature of the feed stream, and then through pipe 25 to secondary condenser 26 wherein it is passed in indirect heat exchanging relationship with a compressed refrigerant vapor stream to liquefy the refrigerant, thereby conserving additional thermal energy.

Heated recycle water, obtained as hereinafter described, is passed through pipe 27 and into an upper zone of column 19 wherein the heated recycle water melts the ascending mass of ice crystals so that a portion of the liquid water rises to the upper portion of the column and another portion of the liquid water is displaced downwardly through the ascending mass of ice crystals, washing therefrom the occluded brine solution. The downwardly passing water eventually refreezes and ascends through the column as a portion of the mass of ice crystals. The liquid water which collects in the upper portion of the column is substantially free from salt and is withdrawn via pipe 28 and introduced into an upper portion of primary condenser 29.

Vaporized refrigerant is removed from an upper portion of freeze tank 14 via pipe 30, is compressed in primary compressor 31, and is introduced through pipe 32 into a lower portion of primary condenser 29, wherein the refrigerant vapors are passed countercurrently to and in direct contact with the purified water introduced through pipe 28 thus condensing a portion of the refrigerant vapors. The purified water and the liquefied refrigerant collect in a lower portion of primary condenser; the liquid refrigerant is withdrawn through pipe 33 and introduced in freeze tank 14, while the purified water is withdrawn through pipe 34 and pump 35, and a portion of the thus withdrawn water is passed through pipe 27 to purification column 19 as heated recycle water. The remainder of the thus withdrawn water is passed through pipe 36 to heat exchange zone 12 wherein it is passed in heat exchanging relationship with the sea water feed stream in pipe 13, and then through pipe 37 to secondary condenser 26 wherein it is passed in heat exchanging relationship with the refrigerant in pipe 38. The remaining cooled refrigerant vapors in primary condenser 29 are withdrawn from an upper portion of primary condenser 29 via pipe 39, are compressed in secondary compressor 41, and are passed through pipe 38 and secondary condenser 26 in indirect heat exchanging relationship with the concentrated brine stream in pipe 25 and the purified water product stream in pipe 37 to liquefy the compressed refrigerant vapors. The liquid refrigerant is passed through pipe 15 and introduced into freeze tank 14.

In the operation of the process it is desirable that energy costs be minimized. This is accomplished in accordance with the present invention by passing the purified water stream from purification column 19 in direct heat exchanging relationship with the refrigerant vapors which have been recovered from freeze tank 14 and compressed, thereby liquefying a large portion of the refrigerant vapors and substantially cooling the unliquefied refrigerant vapors. The cooled unliquefied refrigerant vapors are then compressed in a secondary compressor and passed in indirect heat exchange relationship with both the concentrated brine stream and the purified water product stream, thereby liquefying the remainder of the refrigerant. The use of heated recycle water to melt the ice crystals in purification column 19 reduces the possibility of "channeling" effects which can result if the refrigerant vapor is introduced into the purification column.

The invention has been described as applied to the preferred embodiment of recovering fresh water from sea water, using normal butane as the refrigerant. Butane is a preferred refrigerant because of the small difference in the boiling point of the refrigerant at low pressure and the freezing point of water; however, other refrigerants are applicable in the practice of this invention. Other preferred refrigerants include propane; isobutane; the butenes, e.g., 1-butene; the various polychlorofluoromethanes (Freons); halogenated hydrocarbons, e.g., ethyl chloride; and the like. Any refrigerant having a vapor pressure of about ½ to about 5 atmospheres at temperatures in the range from about 20 to 32° F., which are essentially insoluble in water at these conditions can be utilized advantageously in the practice of this invention. Refrigerants which have limited solubility in water, such as $CO_2$ and binary mixtures of $CO_2$ and hydrocarbons such as pentane can be selected so as to provide a refrigerant having the properties of the preferred refrigerants hereinbefore defined. When utilizing refrigerants having appreciable solubility in water, it will usually be advantageous to include steps for recovering the refrigerant from the salt-free water and the brine streams removed from the system.

The invention is not limited to the recovery of fresh water from sea water but can also be applied to the concentration of any aqueous solution, for example, the concentration of fruit juices, milk, sugar solutions, and the like. The temperatures and pressures employed will be those required to vaporize the liquid refrigerant in the freeze tank to form ice crystals in the solution to be concentrated and to melt the ice crystals in the purification column to form liquid water and liquid refrigerant.

The advantage of using normal butane which has a vapor pressure of 15 p.s.i.a. at 32° F. becomes apparent because the freeze tank can be operated at slightly less than atmospheric pressure and the purification column can be operated at slightly more than atmospheric pressure. Compression of the vaporized normal butane withdrawn from the freeze tank is substantially the only energy requirement for the process. When the freeze tank is operated at atmospheric pressure or greater, a pump is required to feed the brine to the freeze tank.

The freeze tank can be operated at about 3 or more p.s.i., e.g., 3 to 10 p.s.i., below the vapor pressure of the refrigerant at 32° F. and the purification column can be operated at about 3 or more p.s.i. above the vapor pressure of the refrigerant at 32° F. In some processes it is desirable to operate the purification column at high pressure such as in the range of about 50 to 150 p.s.i.a. to provide better compacting and purification of the ice crystals in the purification column.

The following table is presented to demonstrate the efficiency of the process and the small differential possible in carrying out the process, but is not to be construed in limitation thereof.

| Stream | Rate, lb./hr. | Temp., °F. | Pressure, p.s.i.a. | Wt. percent ice |
|---|---|---|---|---|
| Feed (output of pump 11) | 1,000 | 60 | 40 | 0 |
| 13 | 1,000 | 37 | 16 | 0 |
| 16 | 1,000 | 25 | 16 | 35 |
| 18 | 1,000 | 25 | 116 | 35 |
| 28 | 5,135 | 36 | 18 | 0 |
| 27 | 4,820 | 47 | 124 | 0 |
| 22 | 685 | 25 | 66 | 0 |
| 23 (no recycle) | | | | |
| 24 | 685 | 25 | 66 | 0 |
| 25 | 685 | 55 | 35 | 0 |
| 30 | 409 | 25 | 13 | 0 |
| 32 | 409 | 49 | 21 | 0 |
| 39 | 108 | 42 | 18 | 0 |
| 38 | 108 | 78 | 35 | 0 |
| 34 | 5,135 | 47 | 24 | 0 |
| 36 | 315 | 47 | 65 | 0 |
| 37 | 315 | 55 | 35 | 0 |
| 33 | 301 | 49 | 24 | 0 |
| 15 | 108 | 60 | 26 | 0 |

A suitable ratio of refrigerant to feed is 0.41 pound of refrigerant circulated per pound of sea water feed. The process can produce a half pound or more of fresh water from each pound of sea water in the feed to the process by recycling brine through line 23 of the figure.

Reasonable variation and modification are possible within the scope of the foregoing disclosure, the drawings, and the appended claims to the invention.

I claim:

1. A method for concentrating an aqueous solution which comprises passing a stream of said solution into a freezing zone; introducing liquid refrigerant into said freezing zone; chilling said solution by the evaporation of said refrigerant in said freezing zone, thereby forming a slurry of ice in mother liquor; recovering refrigerant vapors thus formed; passing said slurry to a purification zone; passing a stream of warm purified water in countercurrent flow to the ice crystals in said purification zone; removing purified water from said purification zone; withdrawing concentrated mother liquor from said purification zone; passing a portion of said concentrated mother liquor, as recycle, to said freezing zone; withdrawing the remainder of said concentrated mother liquor as a first product stream and passing same in indirect heat exchange with said aqueous solution; compressing said refrigerant vapors and passing the thus compressed refrigerant vapors in direct heat exchange in a first heat exchange zone with said purified water removed from said purification zone to condense a portion of said compressed refrigerant vapors; passing the thus condensed refrigerant vapors to said freezing zone; withdrawing the heated purified water from said first heat exchange zone; passing a portion of said heated purified water to said purification zone as said stream of warm purified water; removing the remainder of said heated purified water as a second product stream; withdrawing the uncondensed refrigerant vapors from said first heat exchange zone; compressing said uncondensed refrigerant vapors and passing the thus compressed refrigerant vapors in indirect heat exchange in a second heat exchange zone with said first and second product streams, thereby liquefying the refrigerant vapors and passing the thus liquefied refrigerant from said second heat exchange zone to said freezing zone.

2. A method in accordance with claim 1 wherein said refrigerant is normal butane.

3. A method in accordance with claim 1 wherein said solution is orange juice.

4. A method in accordance with claim 1 wherein said solution is milk.

5. A method in accordance with claim 1 wherein said solution is salt water.

6. A method for concentrating an aqueous solution which comprises passing a stream of said solution into a freezing zone; introducing liquid refrigerant into said freezing zone; chilling said solution by the evaporation of said refrigerant in said freezing zone, thereby forming a slurry of ice in mother liquor; recovering refrigerant vapors thus formed; passing said slurry to a purification zone; passing a stream of warm purified water in countercurrent flow to the ice crystals in said purification zone; removing purified water from said purification zone; withdrawing concentrated mother liquor from said purification zone; passing a portion of said concentrated mother liquor, as recycle, to said freezing zone; withdrawing the remainder of said concentrated mother liquor as a first product stream and passing same in indirect heat exchange with said aqueous solution; compressing said refrigerant vapors and passing the thus compressed refrigerant vapors in direct heat exchange in a first heat exchange zone with said purified water removed from said purification zone; withdrawing the heated purified water from said first heat exchange zone; passing a portion of said heated purified water to said purification zone as said stream of warm purified water; and removing the remainder of said heated purified water as a second product stream; withdrawing the thus cooled refrigerant vapors from said first heat exchange zone; compressing said cooled refrigerant vapors and passing the thus compressed refrigerant in indirect heat exchange in a second heat exchange zone with said first and second product streams and passing the refrigerant from said second heat exchange zone to said freezing zone.

7. A method for concentrating an aqueous solution which comprises passing a stream of said solution into a freezing zone; introducing liquid refrigerant into said freezing zone; chilling said solution by the evaporation of said refrigerant in said freezing zone, thereby forming a slurry of ice in mother liquor; recovering refrigerant vapors thus formed; passing said slurry to a purification zone; causing purified water to flow countercurrently to the ice crystals in said purification zone; removing purified water from said purification zone; withdrawing concentrated mother liquid from said purification zone; passing a portion of said concentrated mother liquor, as recycle, to said freezing zone; withdrawing the remainder of said concentrated mother liquor as a first product stream and passing same in indirect heat exchange with said aqueous solution; compressing said refrigerant vapors and passing the thus compressed refrigerant vapors in direct heat exchange in a first heat exchange zone with said purified water removed from said purification zone to condense a portion of said compressed refrigerant vapors; passing the thus condensed refrigerant vapors to said freezing zone; withdrawing the heated purified water from said first heat exchange zone as a second product stream; withdrawing the uncondensed refrigerant vapors from said first heat exchange zone; compressing said cooled refrigerant vapors and passing the thus compressed refrigerant vapors in indirect heat exchange in a second heat exchange zone with said first and second product streams, thereby liquefying the refrigerant vapors and passing the thus liquefied refrigerant to said freezing zone.

8. Apparatus for the concentration of an aqueous solution comprising a freeze tank, means for passing said solution into said freeze tank, means for evaporating a refrigerant through said solution contained in said tank, means for recovering vapors of the refrigerant from said tank, a purification unit, means for passing an ice containing slurry from said freeze tank to said purification unit, means for introducing warm purified water into said purification unit and countercurrently to the flow of ice crystals in said purification unit, means for withdrawing concentrated mother liquor from said purification unit, means for passing a portion of said mother liquor to said means for evaporating, first heat exchange means for passing the remainder of said mother liquor in indirect heat exchange relationship with said aqueous solution, means for withdrawing purified water from said purification unit, first means for compressing the refrigerant vapors withdrawn from said freeze tank, second heat exchanging means for passing the thus withdrawn purified water in direct heat exchanging relationship with the thus compressed refrigerant vapors, means for withdrawing the above heated water from said second heat exchanging means, means for passing a portion of said heater water to said means for introducing, means for recovering refrigerant vapors from said second heat exchange means, second means for compressing said refrigerant vapors from said second heat exchange means, third heat exchange means for passing the compressed refrigerant from said second means in indirect heat exchange relationship with the remainder of said concentrated mother liquor and the remainder of said thus heated water from said second heat exchange means and then to said means for evaporating.

9. Apparatus for the concentration of an aqueous solution comprising a freeze tank, means for passing said solution into said freeze tank, means for evaporating a refrigerant through said solution contained in said tank, means for recovering vapors of the refrigerant from said tank, a purification unit, means for passing an ice containing slurry from said freeze tank to said purification unit, means for introducing warm purified water into said purification unit and countercurrently to the flow of ice crystals in said purification unit, means for withdrawing concentrated mother liquor from said purification unit, means for passing a portion of said mother liquor to said means for evaporating, first heat exchange means for passing the remainder of said mother liquor in indirect heat exchange relationship with said aqueous solution, means for withdrawing purified water from said purification unit, first means for compressing the refrigerant vapors withdrawn from said freeze tank, second heat exchanging means for passing the thus withdrawn purified water in direct heat exchanging relationship with the thus compressed refrigerant vapors, means for withdrawing the above heated water from said second heat exchanging means, means for passing condensed refrigerant vapors from said second heat exchanging means to said means for evaporating, mean for recovering refrigerant vapors from said second heat exchange means, second means for compressing said refrigerant vapors from said second heat exchange means, third heat exchange means for passing the compressed refrigerant from said second means in indirect heat exchange relationship with the remainder of said concentrated mother liquor and the heated water from said second heat exchange means and then to said means for evaporating.

References Cited by the Examiner

UNITED STATES PATENTS 2,573,516   10/1951   Van der Molen _____ 62—58
2,904,511   9/1959   Donath.

FOREIGN PATENTS 841,374   7/1960   Great Britain.
70,507   6/1946   Norway.

NORMAN YUDKOFF, *Primary Examiner.*